UNITED STATES PATENT OFFICE.

KARL I. SOMLÓ, OF TEMESVÁR, AUSTRIA-HUNGARY.

MALTING GRAIN.

No. 854,003.      Specification of Letters Patent.      Patented May 21, 1907.

Application filed January 31, 1906. Serial No. 298,860.

*To all whom it may concern:*

Be it known that I, KARL I. SOMLÓ, a subject of the King of Hungary, residing at No. 37 Hunyady street, Temesvár, Austria-Hungary, have invented certain new and useful Improvements in Malting Grain, of which the following is a full, clear, and exact description.

The present invention consists of a process for cleansing the grain previous to its being malted.

According to the present process previous to the usual steeping and germinating, the grain is subjected to the action of hot water, the temperature varying according to the character of the grain from 33 to 100° C and the time during which the grain is immersed in the water varying according to the temperature from about 10 seconds to 2 hours. Thus, for instance, with the temperature of the hot water at about 33° C two hours soaking would be about the necessary time, while with the increase of temperature the time is shortened, thus with a temperature of 40 degrees, one hour would be sufficient, with 50°, 10 to 20 minutes, with 60° about 5 to 8 minutes, with 75°, about one minute and with 85° about 10 seconds. The novelty of the process consists in the fact that it has never before been deemed possible to subject the grain to such high temperatures without damaging it.

The advantages of the present process consists in the radical elimination of dust and dirt and particularly in washing out the germs of microörganisms contained or deposited in the crevices of the grains and which as is well known greatly injure the green malt of distilleries and yeast factories as also the appearance of the kiln-dried malt and the quality of the beer produced therefrom. The present day steeping processes are not sufficiently effective and the complicated machinery employed often damages and breaks the grain. According to the present steeping process, the capacity of the grain for receiving water and consequently the germination of the same is much more even. The hot water does not in any way impair the capacity of the grain for germinating nor the formation of diastase, on the contrary, the diastatic power of the malt is considerably increased. The green and kiln-dried malt attained is much purer and has a lighter appearance than that hitherto produced.

I claim as my invention:—

A process for cleansing grain, which consists in subjecting it to the action of hot water at a temperature of from 33° to 100° C for a period ranging from about 2 hours down to 10 seconds, previous to the usual steeping and germinating operations, substantially as described.

In testimony whereof I affix my signature in the presence of two witnesses:

KARL I. SOMLÓ.

Witnesses:
JOSEF WORKMANN,
CHARLES E. ZALTZE.